(12) United States Patent
Hynes, Jr.

(10) Patent No.: US 10,625,822 B1
(45) Date of Patent: Apr. 21, 2020

(54) CONFORMAL SWINGING HYDROFOILS

(71) Applicant: James Patrick Hynes, Jr., Huntington Beach, CA (US)

(72) Inventor: James Patrick Hynes, Jr., Huntington Beach, CA (US)

(73) Assignee: James Patrick Hynes, Jr., Huntington Beach, CA (US)

( * ) Notice: Subject to any disclaimer, the term of this patent is extended or adjusted under 35 U.S.C. 154(b) by 21 days.

(21) Appl. No.: 15/964,908

(22) Filed: Apr. 27, 2018

Related U.S. Application Data

(60) Provisional application No. 62/504,380, filed on May 10, 2017.

(51) Int. Cl.
 *B63B 1/30* (2006.01)
(52) U.S. Cl.
 CPC ..................... *B63B 1/30* (2013.01)

(58) Field of Classification Search
 CPC ........................................................ B63B 1/30
 See application file for complete search history.

(56) References Cited

U.S. PATENT DOCUMENTS

| | | | | | |
|---|---|---|---|---|---|
| 920,849 | A | * | 5/1909 | Fauber | B63B 1/30 114/126 |
| 3,027,862 | A | * | 4/1962 | Votre | B63C 13/00 114/282 |
| 3,183,871 | A | * | 5/1965 | Reder | B63B 1/30 114/281 |
| 5,134,954 | A | * | 8/1992 | Barry | B60F 3/0015 114/274 |
| 5,404,830 | A | * | 4/1995 | Ligozio | B63B 1/30 114/280 |
| 8,051,793 | B2 | * | 11/2011 | Ulgen | B63B 1/30 114/274 |

* cited by examiner

*Primary Examiner* — Stephen P Avila

(57) ABSTRACT

A retractable hydrofoil for marine vessels asymmetrically mounted for-aft on opposing sides of the hull of the marine vessel and a control unit for retracting the hydrofoil from a deployed position to a retracted position.

20 Claims, 6 Drawing Sheets

FIGURE 4a
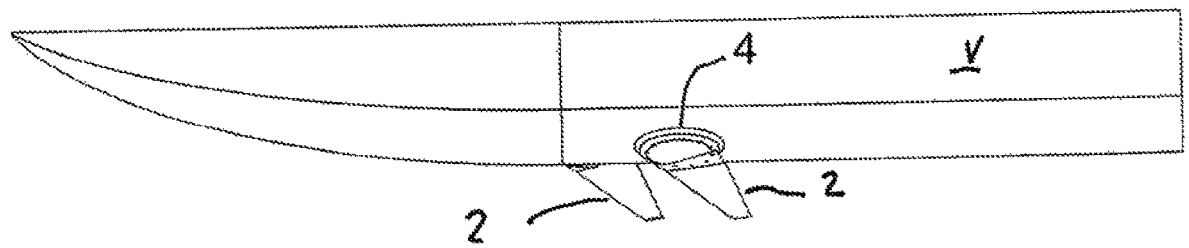
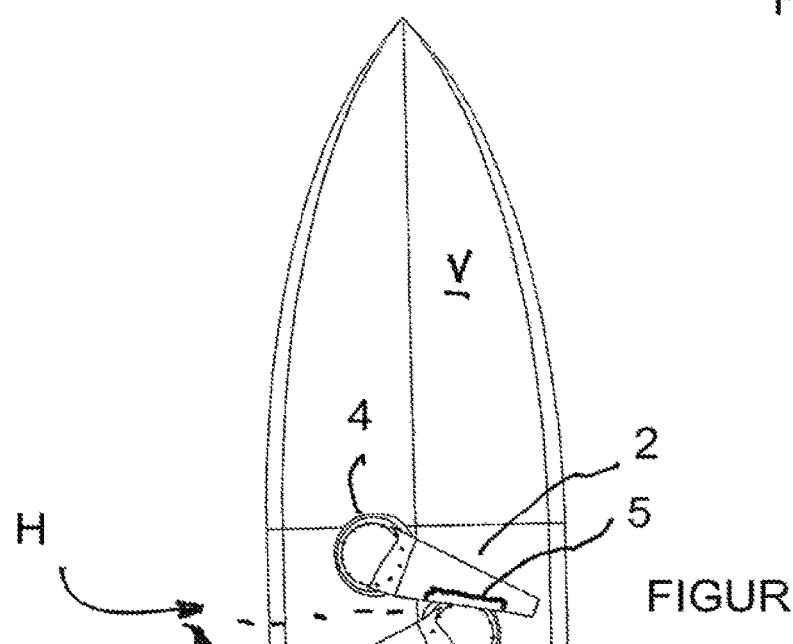
FIGURE 4b

CONFORMAL SWINGING HYDROFOILS

FIELD OF THE INVENTION

The present invention relates generally to the field of retractable hydrofoils for use with amphibious vehicles and marine vessels.

BACKGROUND OF THE INVENTION

Hydrofoils are carriage wings provided at the lower hull of marine vessels for carrying the vessel over the water so as to prevent or minimize water contact of its' underwater hull surface resulting in a reduction of drag forces originating from water contact therewith thereby speeding up the vessel, reducing fuel consumption and providing for more stable travel. Conventionally, hydrofoils are statically mounted at the lower surface of hulls and consequently cannot be retracted.

Barry et al in U.S. Pat. No. 5,134,954 describes a pair of asymmetric hydrofoil assemblies mounted with a marine vessel. Each asymmetric hydrofoil assembly includes a motor and propeller connected to one end of the associated hydrofoil and the other end pivotally connected to the marine vessel. While the first pair of hydrofoils are symmetrically mounted on opposite sides of the marine vessel, Berry considers this arrangement to be an asymmetric because the motors and propellers are not disposed at the mid-point of their respective hydrofoils.

More recently Ulgen in U.S. Pat. No. 8,051,793 has proposed a retractable hydrofoil for marine vehicles. The retractable hydrofoils are mounted in symmetrical pairs on either side of the hull and are connected to sliding means enabling the hydrofoils to rotate vertically to a retracted position.

For over a century, hydrofoils have been known to be more hydrodynamically efficient than planing hulls but their disadvantages, including complex additional structures and a tendency to snag, have precluded their widespread adoption with the exception of niche markets including some sailing craft and smooth water surface piercing ferries.

Consequently, a need continues for retractable hydrofoils which can easily be retrofitted on conventional marine vessels and other amphibious vehicles and which retract from an operational configuration to a stowed configuration conformably with the hull. By mounting the foils conformally with the hull, we retain the simplicity of a smooth hull bottom when stowed, while gaining the efficiency advantage of high aspect ratio composite hydrofoils when deployed. The weight and cost of the propulsion system and the carbon footprint are nominally halved while the craft range is doubled. Additionally when the retractable hydrofoil is in an operational configuration, the hydrofoil is anhedrally positioned with respect to the horizontal plane of marine vessel. In aerodynamics anhedrally positioned wings are known to increase the maneuverability of high performance jet plane. When the hydrofoils are retracted to a stowed position conformally with the hull of the marine vessel, the marine vessel operates as a conventional marine vessel.

SUMMARY OF THE INVENTION

The present invention relates to a retractable hydrofoil having improved performance characteristics. In particular, the retractable hydrofoil comprises a hydrofoil housing assembly and a hydrofoil wing rotatably connected therewith. A pair of such hydrofoils are mounted on opposite sides of the hull of a marine vessel and disposed asymmetrically along the horizontal plane of the marine vessel. Advantageously, a second pair of hydrofoils can also be mounted in a similar fashion astern of the first pair. The hydrofoil further includes a controller for deploying the hydrofoil wings from a stowed position aligned with the centerline of the marine vessel to a fully deployed position athwartships the centerline of the vessel. Operational configurations of the hydrofoil wing are intermediate the stowed position and the fully deployed position wherein the hydrofoil wings form an anhedral angle with the horizontal plane of the marine vessel. Consequently when the hydrofoil wings of the first pair of hydrofoils are deployed to an operational configuration they cross to form an inverted "V" shape. The controller provides for a plurality of operational configurations of the hydrofoil wings including separately positioning each hydrofoil wing or synchronously positioning the hydrofoil wings

BRIEF DESCRIPTION OF THE DRAWINGS

FIG. 4a illustrates a side view of hydrofoils partially deployed in an operational configuration.

FIG. 4b illustrates an underside view of hydrofoils partially deployed in an operational configuration.

REFERENCE NUMBERS USED IN FIGURES

Marine vessel V
Hydrofoil Wing 2
Hydrofoil H
Hydrofoil Housing Assembly 4
King Post K
Bearings B
Controller C
Flap 5

DETAILED DESCRIPTION OF THE INVENTION

In FIGS. 1-6 the retractable hydrofoil of the present invention is generally designated by the letter H.

Figure 1:
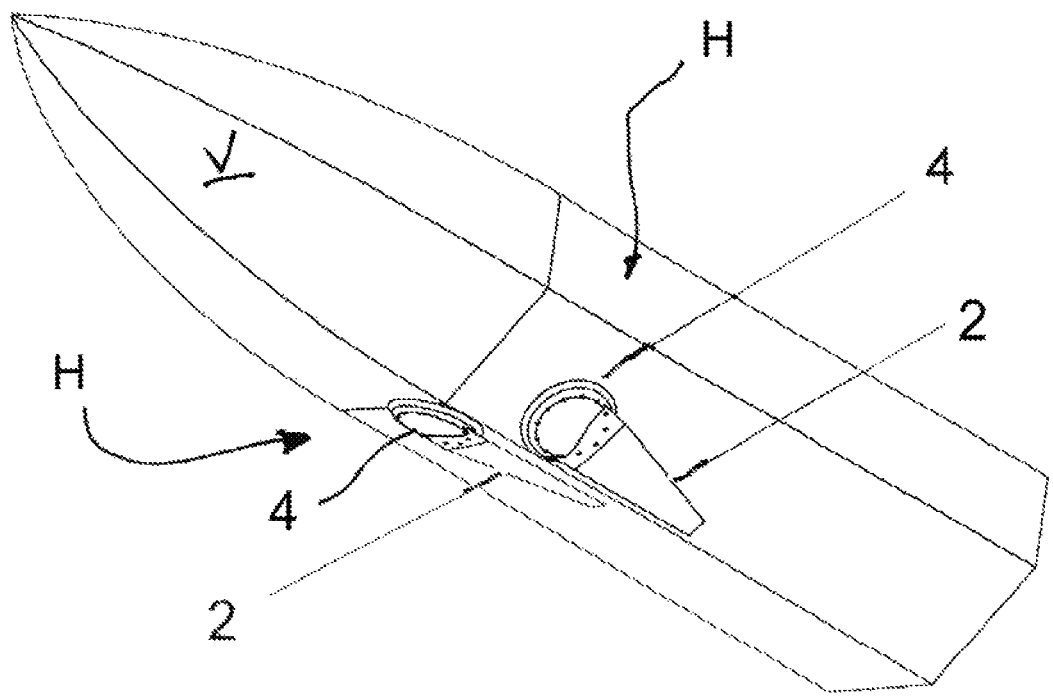
FIG. 1 illustrates a perspective view of hydrofoils mounted on the underwater hull of a marine vessel in a stowed position.

Looking first to FIG. 1, the retractable hydrofoil H will be described in more detail. Each retractable hydrofoil H includes a hydrofoil housing assembly 4 and a hydrofoil wing 2 rotatably connected thereto. The retractable hydrofoils H are asymmetrically mounted on opposing exterior sides of the hull of a marine vessel V. Those skilled in the art will appreciate that such marine vessels V can also include amphibious vehicles. As depicted in FIG. 1, the retractable hydrofoil H is shown with the hydrofoil wings 2 in the stowed position or configuration wherein the spanwise axis of each hydrofoil wing 2 is aligned with the centerline of the marine vessel V. In the stowed configuration each hydrofoil wing 2 is flush to the hull of the marine vessel V. When the hydrofoils H are not needed, the conformal mounting of the hydrofoil wings 2 to the hull allows shallow water operation, beaching and trailering.

Figure 2:
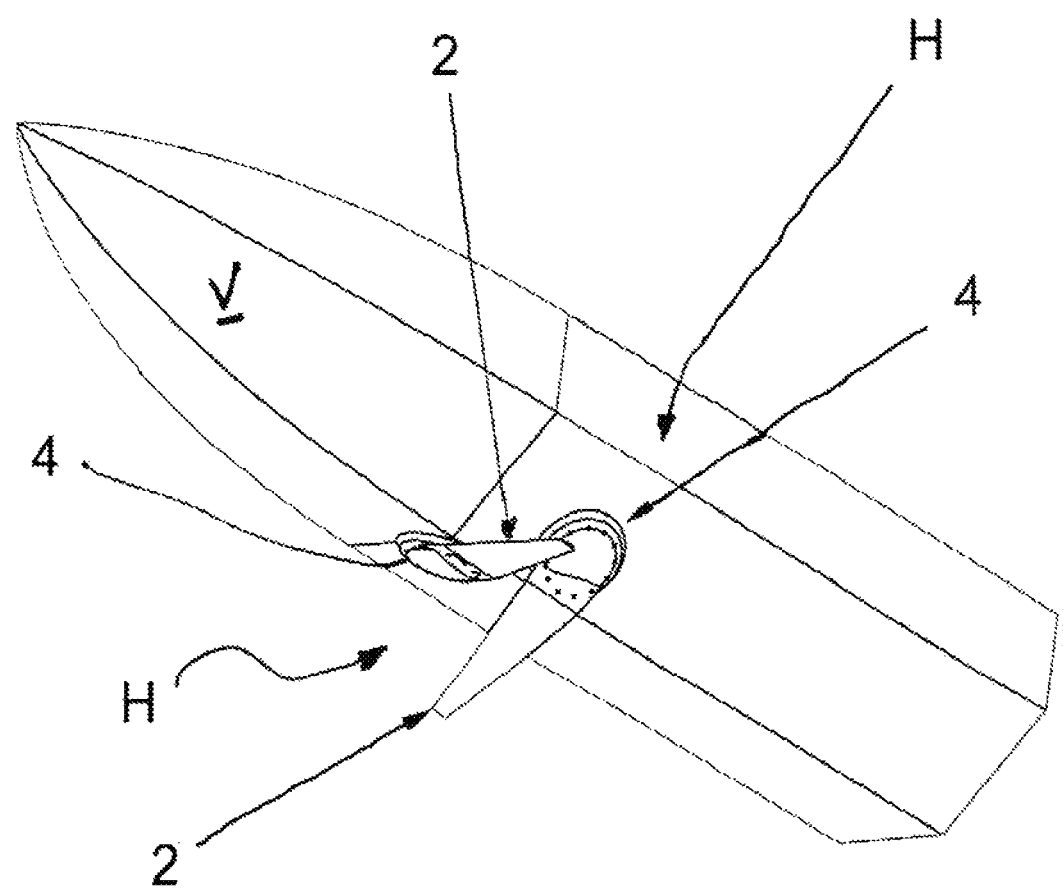
FIG. 2 illustrates a perspective view of hydrofoils in a fully deployed position.
Figures 3A, 3B:
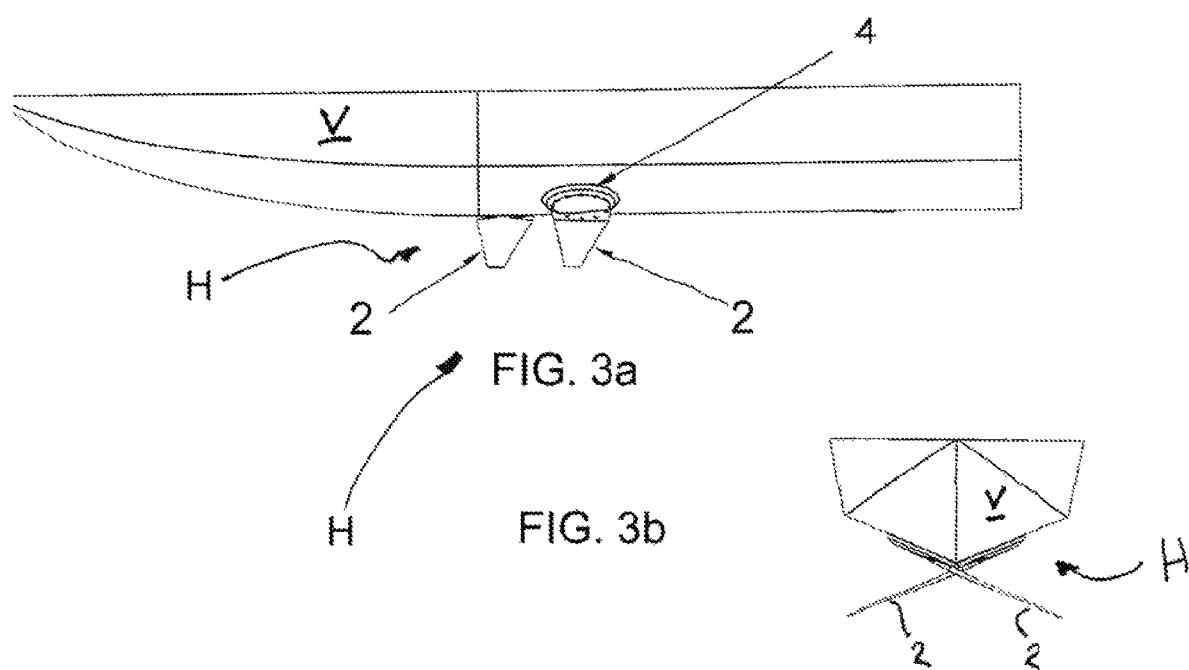
FIG. 3a illustrates the asymmetric arrangement of hydrofoils in a fully deployed position.
FIG. 3b illustrates the anhedral alignment of the hydrofoils and the resulting "V" shape formed by a pair of fully deployed hydrofoils.

Looking next to FIGS. 2, 3*a* and 3*b*, the hydrofoils H are shown in the fully deployed and operational configuration wherein each hydrofoil wing 2 extends athwartship of the marine vessel V centerline. Moreover, the asymmetric spacing of a pair of hydrofoils H mounted on opposing sides of the marine vessel V can clearly be seen. As used herein such spacing is considered asymmetric because the hydrofoil H mounted on one side of the hull is a displaced longitudinal distance along the centerline of the marine vessel V from the hydrofoil H mounted on the opposing side of the marine vessel V. Moreover, when the hydrofoil wings 2 reach across the keel of the marine vessel V, as seen in FIGS. 3*a* and 3*b*, they form a staggered anhedral angel with the horizontal plane of the marine vessel V or inverted "V-shaped" wings. The fore-aft mounting asymmetry of the pair of opposing hydrofoils H is required to prevent interference but has little impact on hydrodynamic performance. If an object on or under the water is struck by the hydrofoil wings 2 they will be swept back or sheared off.

Figure 6:
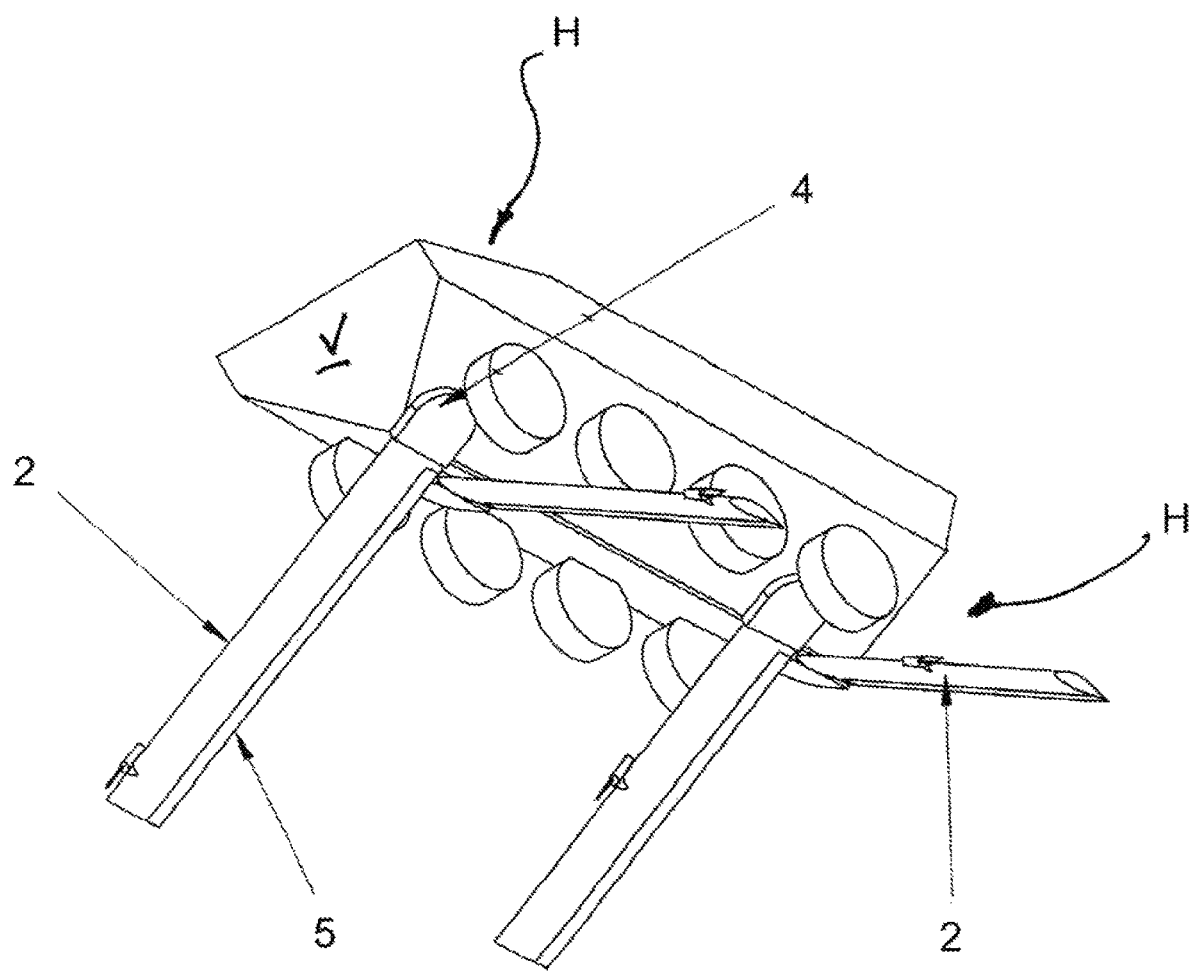
FIG. 6 illustrates a perspective view of two pair of retractable hydrofoils mounted on an amphibious vehicle.

Advantageously a single pair of opposing hydrofoils H can be mounted forward on the marine vessel V followed by a T foil or hybrid planing surface in the rear. Two or more pairs of hydrofoils H can be used as shown in FIG. 6. Those skilled in the art will appreciate that other configurations are possible.

Looking next to FIGS. 4*a* and 4*b*, the retractable hydrofoils H are shown deployed to a position intermediate the stowed position of FIG. 1 and the fully deployed position of FIGS. 2, 3*a* and 3*b*. The extent of the sweep angle A of a hydrofoil wing 2 is defined by the dashed lines representing the fully deployed position of the hydrofoil wing 2 athwartship and the stowed position aligned with the centerline of the marine vessel V. The sweep angle A defines the range of operational configurations of the retractable hydrofoil H. Additionally, each hydrofoil wing 2 includes a flap 5 rotatably connected to the trailing edge thereof which can provide additional hydrodynamic control of the hydrofoils H. Not shown in either FIG. 4*a* or 4*b* is a control unit for rotatably positioning the hydrofoil H between the stowed and fully deployed positions and the flaps 5.

Figure 5:
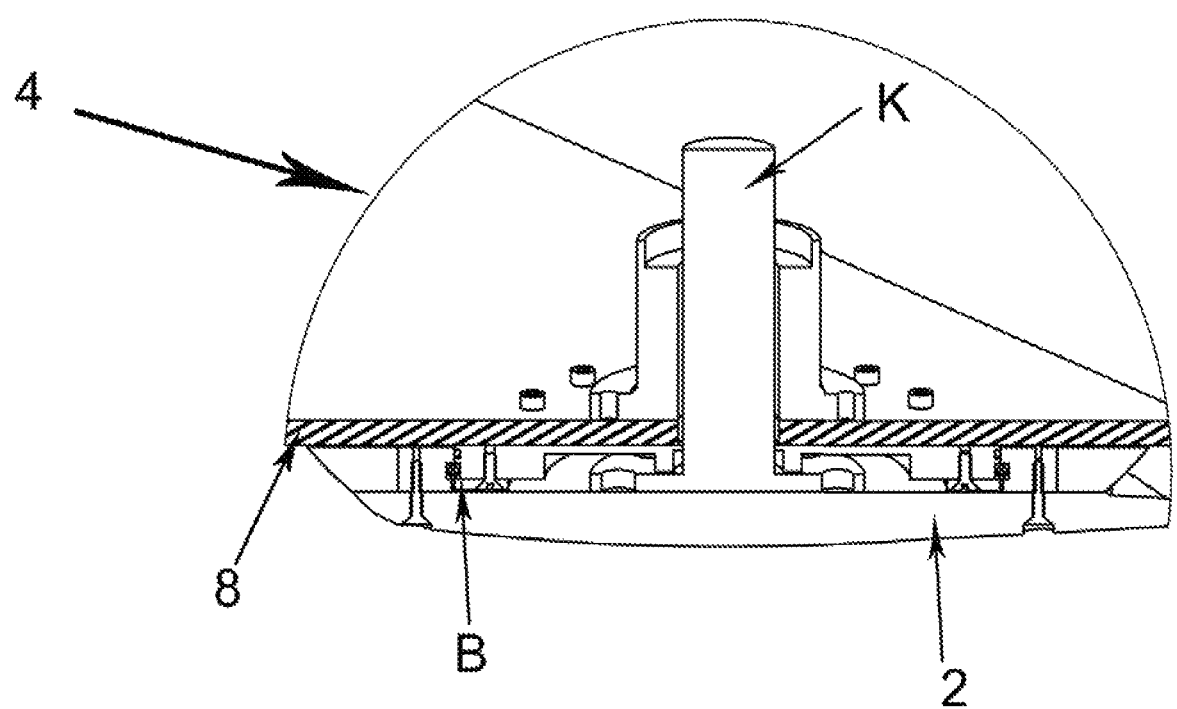
FIG. 5 illustrates a cross-sectional perspective view of the hydrofoil assembly with a hydrofoil wing attached.

Looking next to FIG. 5, the hydrofoil housing assembly 4 is depicted in more detail. Those skilled in the art will understand that the rotatably connected hydrofoil wing 2 can rotate on a kingpost K supported by vertically spaced bearings or on a horizontal turntable bearing B as depicted in FIG. 5. While not shown, those skilled in the art will understand that bearing pivots mounted external to the hull 8 of the marine vessel V allow retrofit to existing planing boats, seaplane, assault craft etc. The pivots can be geared together to allow a single control unit C (not shown) or deployment actuator which can be internal or external to the hull.

The sweep angle A for a pair of hydrofoils H can be modulated synchronously or separately or independently by the control unit C (not shown) to control several axes of hull motion. Increasing sweep angle A during high speed operation raises the cavitation speed. Alternatively, flaps 5 added to the trailing edge of the hydrofoil wing 2 can modulate lift. The hydrofoils wings 2 can be made of lightweight composite materials. The main impetus is increased lift efficiency which improves vehicle range and reduces the installed power requirement. A second advantage is the potential for shock mitigation and improved ride quality as the foils add rattle space and can act as passive or active shock absorbers. Low profile anti-ventilation fences can be added to the leading edge without affecting the stowing capability.

FIG. 6 is provided to illustrate the use of two pair of retractable hydrofoils H of the present invention with an amphibious vehicle.

The invention claimed is:

1. Retractable hydrofoils mounted with a vessel, comprising:
 a first pair of retractable hydrofoils each mounted on opposing sides of the hull and at one end of the vessel, wherein the first retractable hydrofoil of the first pair of retractable hydrofoils is mounted asymmetrically with respect to the second retractable hydrofoil of the first pair of retractable hydrofoils a displaced longitudinal distance along the centerline of said vessel.

2. The retractable hydrofoils of claim 1, further comprising:
 a second pair of retractable hydrofoils each mounted on opposing sides of the hull of the vessel and at the opposite end of the vessel, wherein the first retractable hydrofoil of the second pair of retractable hydrofoils is mounted asymmetrically with respect to the second retractable hydrofoil of the second pair of retractable hydrofoils a displaced longitudinal distance along the centerline of said vessel.

3. The retractable hydrofoil of claim 1, further including:
 each retractable hydrofoil includes a hydrofoil wing, and control means for deploying each hydrofoil wing from a stowed position wherein the span-wise axis of each hydrofoil wing is aligned with the centerline of the vessel to a fully deployed position wherein the span-wise axis of each hydrofoil wing is athwartships of the centerline of the vessel.

4. The retractable hydrofoil of claim 3, wherein said control means for deploying each hydrofoil wing includes means for rotating each hydrofoil wing through a sweep angle defined by the stowed and fully deployed positions crosswise to the centerline of the vessel forming an inverted "V" beneath the vessel.

5. The retractable hydrofoil of claim 4, wherein each hydrofoil wing is anhedrally aligned when in an operational position intermediate the stowed and fully deployed positions.

6. The retractable hydrofoil of claim 4, further including:
 means for modulating the sweep angle of each hydrofoil wing between the stowed position and the fully deployed position.

7. The retractable hydrofoil of claim 4, further including:
 means for independently modulating the sweep angle of each hydrofoil between the stowed position and the fully deployed position.

8. The retractable hydrofoil of claim 4, further including:
 means for synchronously modulating the sweep angle of each hydrofoil wing between the stowed position and the fully deployed position.

9. The retractable hydrofoil of claim 3, wherein each hydrofoil wing is conformal with the hull of the vessel when in the stowed position.

10. The retractable hydrofoil of claim 1, further including:
 means for rotating each hydrofoil through a sweep angle to form an anhedral angle with respect to the horizontal plane of the vessel.

11. A retractable hydrofoil adapted to be mounted with the hull of a vessel, comprising:
- a housing assembly;
- a hydrofoil wing rotatably connected to the housing assembly, and;
- means for rotating the hydrofoil wing through a sweep angle from a first stowed position conformal to the hull of the vessel and aligned with the centerline of the vessel to a second fully deployed position wherein the hydrofoil wing crosses under the centerline on of the vessel and is athwartship thereto and forms an anhedral angle with respect to the horizontal plane of the vessel when mounted therewith.

12. The retractable hydrofoil of claim 11, further including:
- flaps adjustably mounted with the trailing edge of the hydrofoil wing.

13. The retractable hydrofoil of claim 11, further including:
- means for modulating the sweep angle of the hydrofoil wing between the stowed and fully deployed positions.

14. A method of operating a pair of hydrofoils each asymmetrically mounted a spaced longitudinal distance from the other and on opposite sides of the hull of a vessel, including the step of:
- rotating each hydrofoil through a sweep angle defined by stowed position of each hydrofoil aligned with the centerline of the vessel to a fully deployed position of each hydrofoil aligned athwartships the centerline of the vessel.

15. The method of claim 14, further including the step of:
- modulating the operational position of each hydrofoil between the stowed and athwartship positions.

16. The method of claim 14, further including the step of:
- independently modulating the operational position of each hydrofoil between the stowed and athwartship positions.

17. The method of claim 14, further including the step of:
- synchronously modulating the operational position of each hydrofoil between the stowed and athwartship positions.

18. The method of claim 14, further including the step of:
- rotating each hydrofoil through a sweep angle to form an anhedral angle with respect to the horizontal plane of the vessel when mounted therewith.

19. A vessel having only a single pair of retractable hydrofoils, consisting of:
- a first pair of retractable hydrofoils each mounted on opposing sides of the hull of vessel, wherein the first retractable hydrofoil of the pair of retractable hydrofoils is mounted asymmetrically with respect to the second retractable hydrofoil a displaced longitudinal distance along the centerline of said vessel.

20. The retractable hydrofoil of claim 19, further consisting of:
- means for rotating the hydrofoils through a sweep angle to form an anhedral angle with respect to the horizontal plane of the vessel wherein each hydrofoil crosses under the centerline of the vessel and form an inverted "V" thereunder.

* * * * *